(12) United States Patent  (10) Patent No.: US 8,727,658 B2
Norman  (45) Date of Patent: May 20, 2014

(54) PINLESS DEVICE FOR ORIENTING A MOTORCYCLE STABILIZER WIPER

(76) Inventor: Ralph S. Norman, San Diego, CA (US)

(*) Notice: Subject to any disclaimer, the term of this patent is extended or adjusted under 35 U.S.C. 154(b) by 1525 days.

(21) Appl. No.: 11/787,922

(22) Filed: Apr. 17, 2007

(65) Prior Publication Data

US 2011/0097143 A1    Apr. 28, 2011

(51) Int. Cl.
B62K 11/00 (2013.01)
F16B 17/00 (2006.01)
B62K 21/08 (2006.01)
B62K 21/00 (2006.01)
B62D 7/22 (2006.01)

(52) U.S. Cl.
CPC .............. *B62K 21/08* (2013.01); *B62K 21/00* (2013.01); *B62D 7/22* (2013.01)
USPC .......................................... 403/362; 188/290

(58) Field of Classification Search
CPC ........... B62K 21/08; B62K 21/00; B62D 7/22
USPC .................. 188/290, 309, 310; 280/272, 771; 403/362, 345
See application file for complete search history.

(56) References Cited

U.S. PATENT DOCUMENTS 4,572,337 A * 2/1986 Johansson ..................... 188/268

* cited by examiner

*Primary Examiner* — Joseph M Rocca
*Assistant Examiner* — Jacob Knutson
(74) *Attorney, Agent, or Firm* — Fehr Law Firm; Thompson E. Fehr

(57) ABSTRACT

A pinless device for orienting a motorcycle stabilizer wiper, such device having a platform adapted for stable attachment to a motorcycle; projections extending, preferably upward, from the platform in order to create a channel; an arm having a first end adapted for attachment to a shaft from a wiper of a motorcycle stabilizer and also having a second end of such dimensions that the second end can fit in the channel between the projections; and a means, such as a set screw, for releasably and securely fastening the second end of the arm in the channel between the projections.

9 Claims, 11 Drawing Sheets

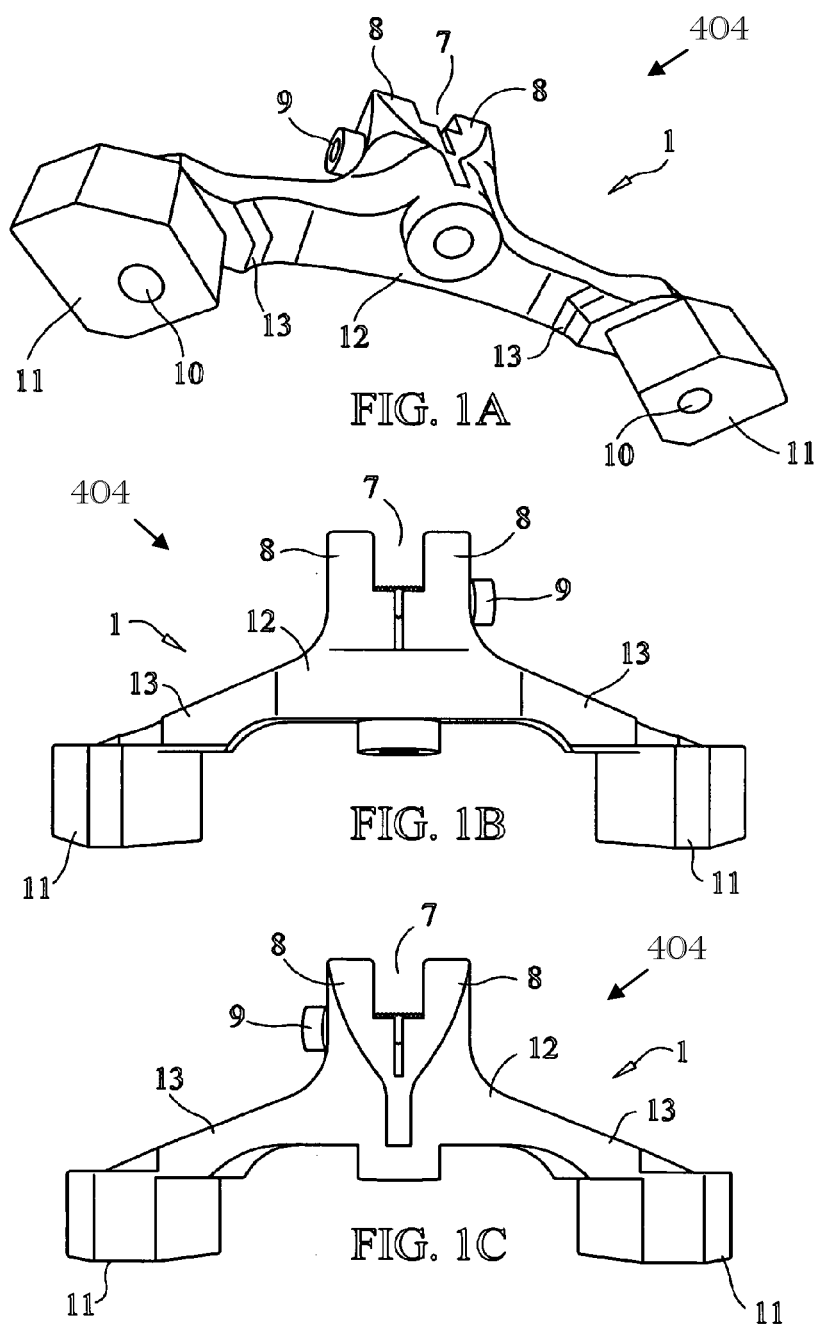

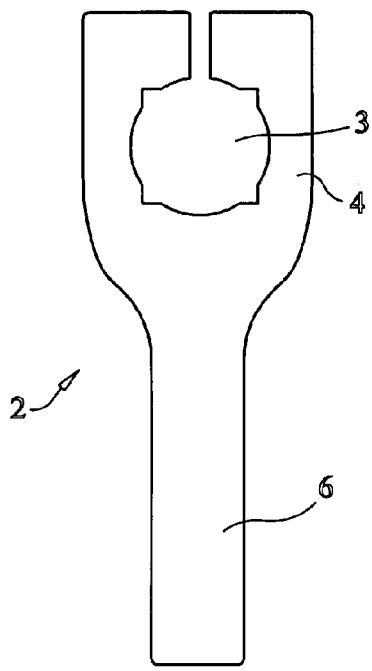
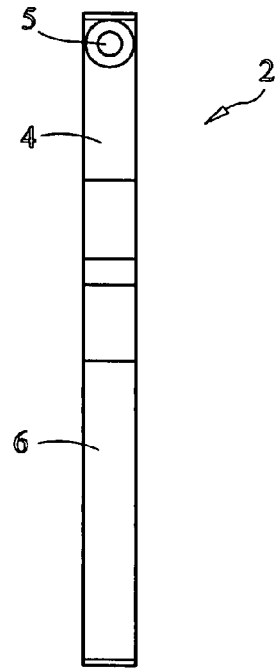
FIG. 2A
FIG. 2B
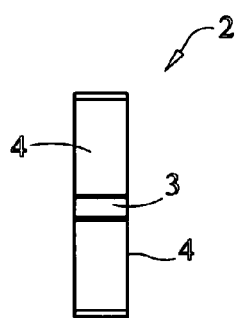
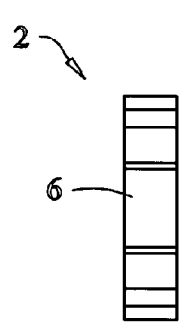
FIG. 2C
FIG. 2D

PINLESS DEVICE FOR ORIENTING A MOTORCYCLE STABILIZER WIPER

BACKGROUND OF THE INVENTION

1. Field of the Invention

This invention relates to an arm of a motorcycle stabilizer and a mount for holding such arm substantially parallel to the frame of the motorcycle when such arm does not have an aperture through which a pin attached, directly or indirectly, at one end to the frame of the motorcycle can extend.

2. Description of the Related Art

A motorcycle stabilizer reduces the tendency of the front wheel of the motorcycle to wobble when it strikes a bump.

A housing contains a vane, also termed a wiper, which separates the two sides of the interior of the housing. There is transmission fluid on both sides of the housing and within a passage which connects the sides of the housing. A valve in the passage controls how hard it is for the fluid to flow through the passage between the two sides of the interior of the housing.

The general interior workings, i.e., primarily the vane within the housing, are shown well in the first three figures of U.S. Pat. No. 4,773,514, which, for convenience, have been attached hereto. In that particular patent, the flow of the fluid is through the cover. In others, e.g., U.S. Pat. No. 6,401,884, the flow is through the body of the housing, itself, or, in U.S. Pat. No. 6,899,208, through the wiper.

The housing is indirectly connected to the front wheel of the motorcycle, e.g., by being attached to the handlebars of the motorcycle. An arm is connected below the housing to a shaft that is, in turn, connected to the wiper (with appropriate o-rings involved to prevent a loss of the fluid).

In the prior art a pin is connected to the frame of the motorcycle as well as to the arm from the wiper. Consequently, the arm holds the vane parallel to the frame of the motorcycle. Thus, when the front wheel of the motorcycle rotates, the housing rotates about the vane. This pushes fluid from the interior side of the housing which is moved closer to the vane, through the passage, to the interior side of the housing which is moved farther from the vane. The harder that it is for the fluid to flow through the passage (based on the setting of the valve), the more damping there will be with regard to movement of the front wheel.

FIG. 5 in U.S. Pat. No. 6,401,884 shows the connection of the arm 33 having a first end 34 attached to the vane and a second end 35 connected to a pin of the prior art.

The top of the pin was, in practice, traditionally loosely held in a channel within the arm, and the bottom was loosely held in a cavity within the frame of the motorcycle (or something rigidly attached to the frame of the motorcycle).

A yoke 21, shown in FIG. 4 and FIG. 5 containing a cavity 15 is utilized to connect the prior-art pin 16 to the frame 100 of a motorcycle 101, as illustrated in FIG. 5. Rather than having the second end 6 of the arm 2 fit into a channel 7 in the yoke 1, as is done with the present invention, the second end 6 of the arm 2 contains an aperture 19 into which the upper end 18 of the prior-art pin 16 fits. The lower end 17 of the prior-art pin 16 is contained within the cavity 15.

The hydraulic damping device of U.S. Pat. No. 4,773,514, though, appears to be an aberration in the way the arm 9a is connected to the frame of a motorcycle. The text of the disclosure merely says, in lines 17 through 21 of column 3, "A shaft extension 8a (only visible in FIG. 2) extends downwards from the casing 6 and is rigidly connected to a radial arm 9, the free end 9a of which is secured to a bracket 4b at the upper part of the motor cycle [sic] frame."

BRIEF SUMMARY OF THE INVENTION

In lieu of the prior-art pin, for the present invention a stable platform, preferably a y-shaped yoke, is connected to the frame of the motorcycle as well as to the arm from the wiper.

As mentioned above, the top of the prior-art pin was loosely held in a channel within the arm, and the bottom was, in a first embodiment, loosely held in a cavity within the frame of the motorcycle (or something rigidly attached to the frame of the motorcycle). The present platform, preferably the yoke, is, however, securely fastened to the frame of the motorcycle (or something rigidly attached to the frame of the motorcycle). Also, the top of the platform, preferably the top of the yoke, which holds the arm, can be tightened, preferably with a set screw, so that the arm is securely held. Both secure attachments cause the dampening of the front wheel to be more precise.

Moreover, the stabilizer and arm can be removed, e.g., for maintenance, without having to remove the yoke, as would be the case with respect to the rigidly connected arm and bracket of U.S. Pat. No. 4,773,514, and without the yoke become unstable, as would the prior-art pin.

BRIEF DESCRIPTION OF THE SEVERAL VIEWS OF THE DRAWING

FIG. 1A is a perspective view from below a preferred embodiment of the platform, i.e., the yoke, for the Pinless Device for Orienting a Motorcycle Stabilizer Wiper.

FIG. 1B is a view of the rear of the yoke of FIG. 1A.

FIG. 1C is a view of the front of the yoke of FIG. 1A.

FIG. 2A is a view of either the top or the bottom (since they are identical) of a preferred arm for a stabilizer.

FIG. 2B is a view of a first side of the arm for a stabilizer of FIG. 2A.

FIG. 2C is a view of a first end of the arm for a stabilizer of FIG. 2A.

FIG. 2D is a view primarily of the second end of the arm for a stabilizer of FIG. 2A.

DETAILED DESCRIPTION OF THE INVENTION

Figure 1D:
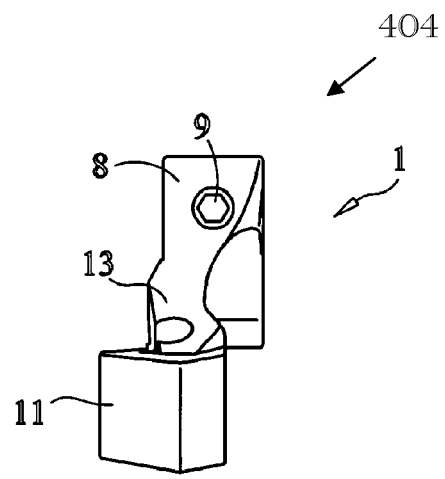
FIG. 1D is a view of the right side of the yoke of FIG. 1A.
Figure 1E:
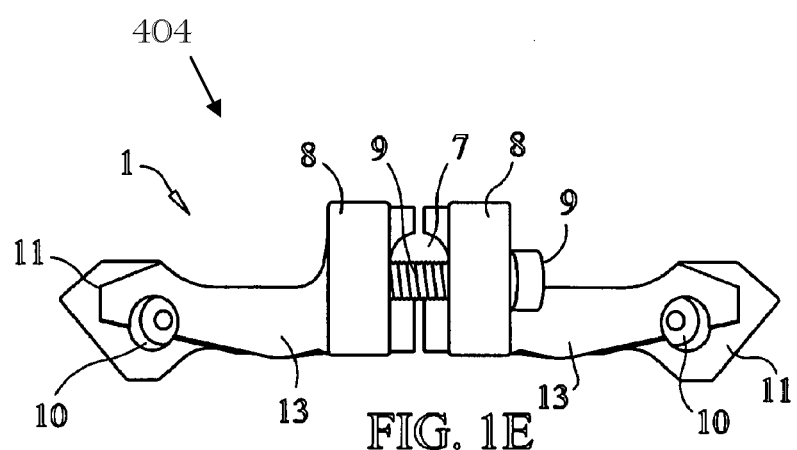
FIG. 1E is a plan view of the yoke of FIG. 1A.
Figure 1F:
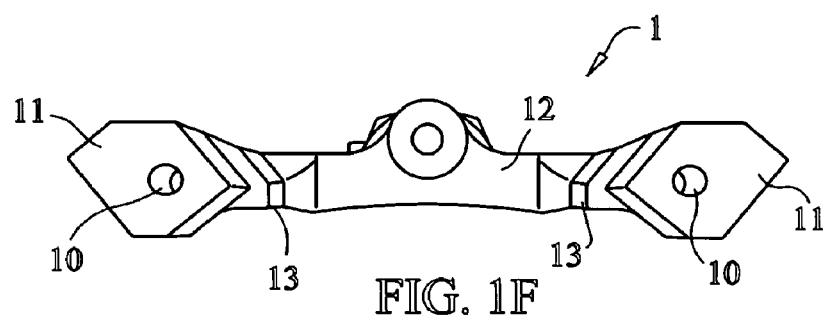
FIG. 1F is a view of the bottom of the yoke of FIG. 1A.
Figure 2E:
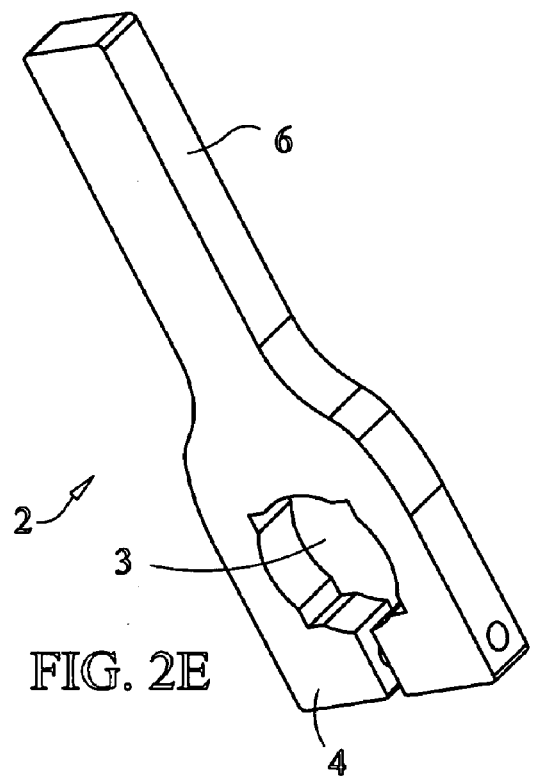
FIG. 2E is a perspective view from below and to a second side of the arm for a stabilizer of FIG. 2A.
Figure 2F:
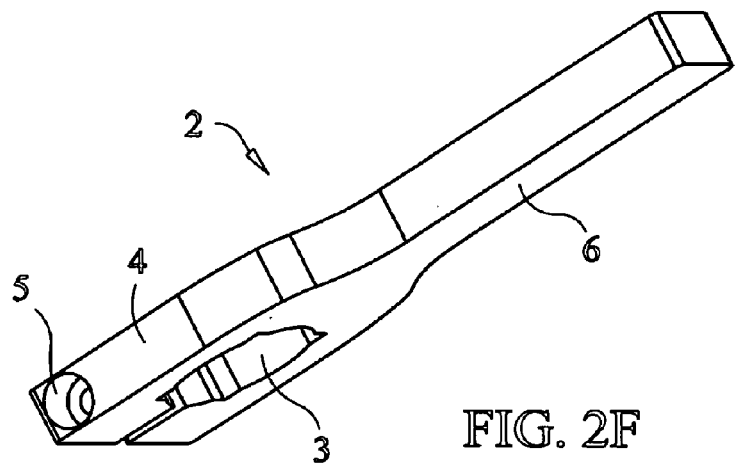
FIG. 2F is a perspective view from below and to a first side of the arm for a stabilizer of FIG. 2A.

The present Pinless Device for Orienting a Motorcycle Stabilizer Wiper comprises, in a preferred embodiment, the y-shaped yoke 1 of FIG. 1 and the arm 2 of FIG. 2.

Preferably, using the channel 3 within the first end 4 of the arm 2, the arm 2 is attached to the shaft 400 that extends outside the bottom 401 of the housing 402 of the stabilizer 300 and that is connected, within the housing 402 of the stabilizer 300, to the wiper 403. A set screw 5, threadedly placed with the first end 4 of the arm 2 so that the set screw 5 can be screwed into the channel 3 while also being partially retained in the first end 4 of the arm 2, is preferably utilized to tighten the first end 4 of the arm 2 about the shaft. (In a lateral view, this connection appears the same as that shown, using the prior-art pin at the second end 6 of the arm 2, in FIG. 5 of U.S. Pat. No. 6,401,884.)

The second end 6 of the arm 2 is, in the present invention, inserted into the channel 7 that exists between the projections 8 extending, preferably upward, from the yoke 1. Again, preferably a second set screw 9, threadedly placed in either of the projections 8 so that the second set screw 9 can be screwed into the channel 7 while also being partially retained in such projection 8, is utilized to tighten the projections 8 about the second end 6 of the arm 2.

Preferably an aperture 10 exists within each of the bases 11 of the yoke 1.

The projections 8 preferably rise vertically from a body 12 of the yoke 1. Preferably proceeding downward and outward are lateral segments 13 which preferably connect the body 12 to the bases 11.

Figure 3:
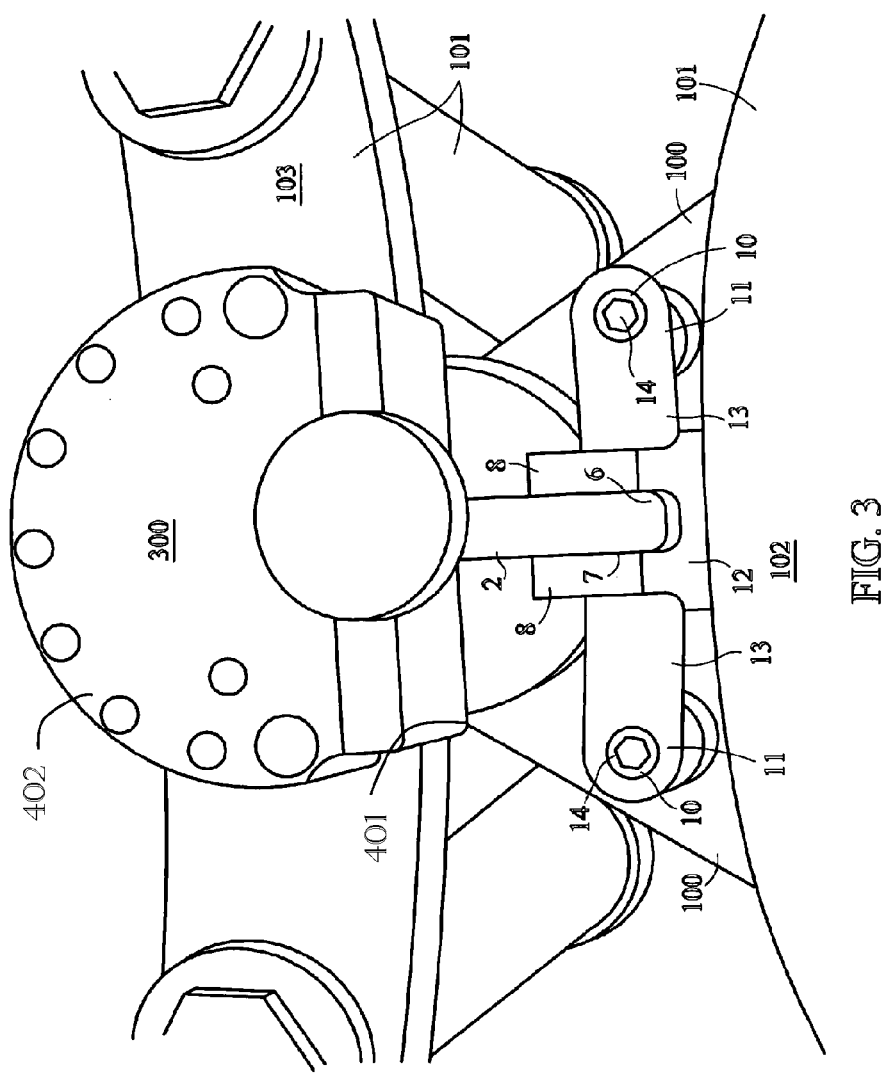
FIG. 3 is a perspective view from above a preferred embodiment of the Pinless Device for Orienting a Motorcycle Stabilizer Wiper installed on a motorcycle.
Figure 4:
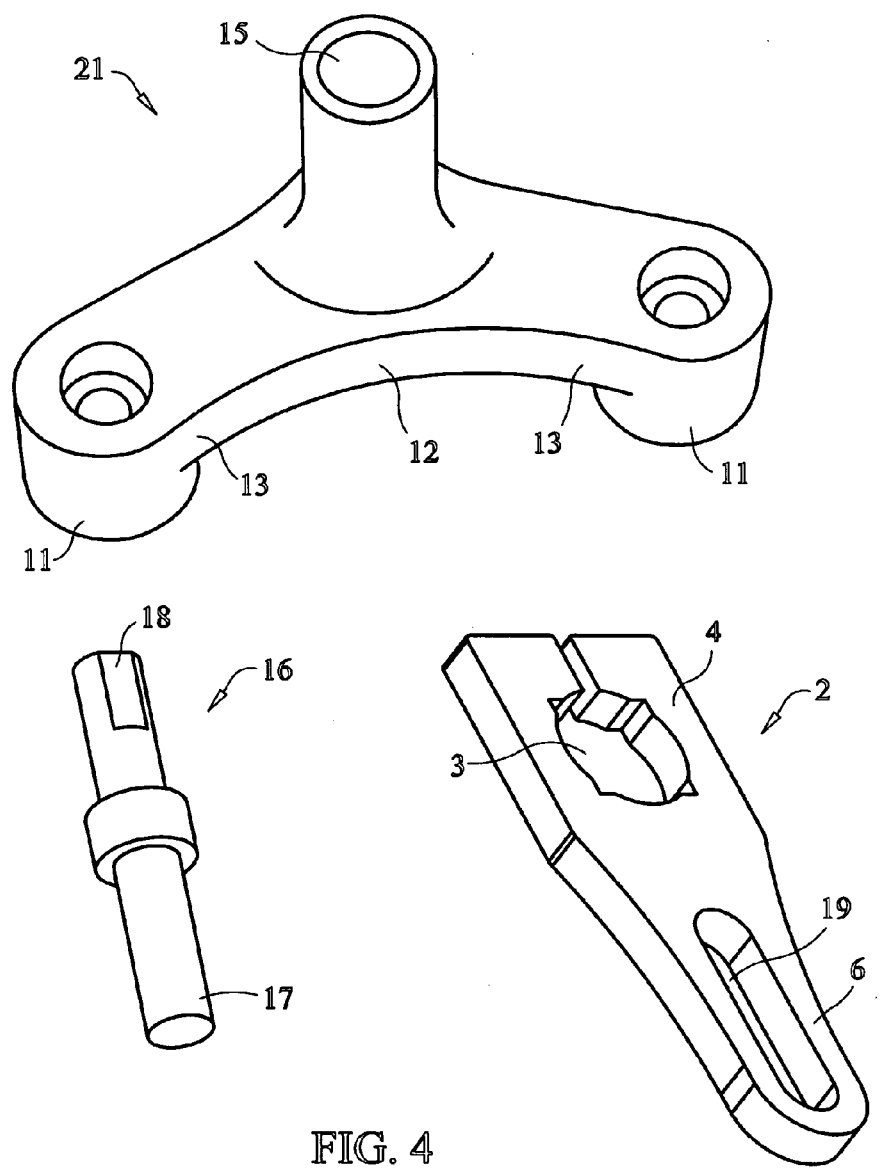
FIG. 4 shows the yoke and pin of a prior-art pin mount for a stabilizer arm as well as the arm, itself.

For connection of the yoke 1 to the frame 100 of a motorcycle 101, preferably fasteners 14, which are preferably screws or bolts passing through the apertures 10, are employed, as shown in FIG. 3.

Figure 5:
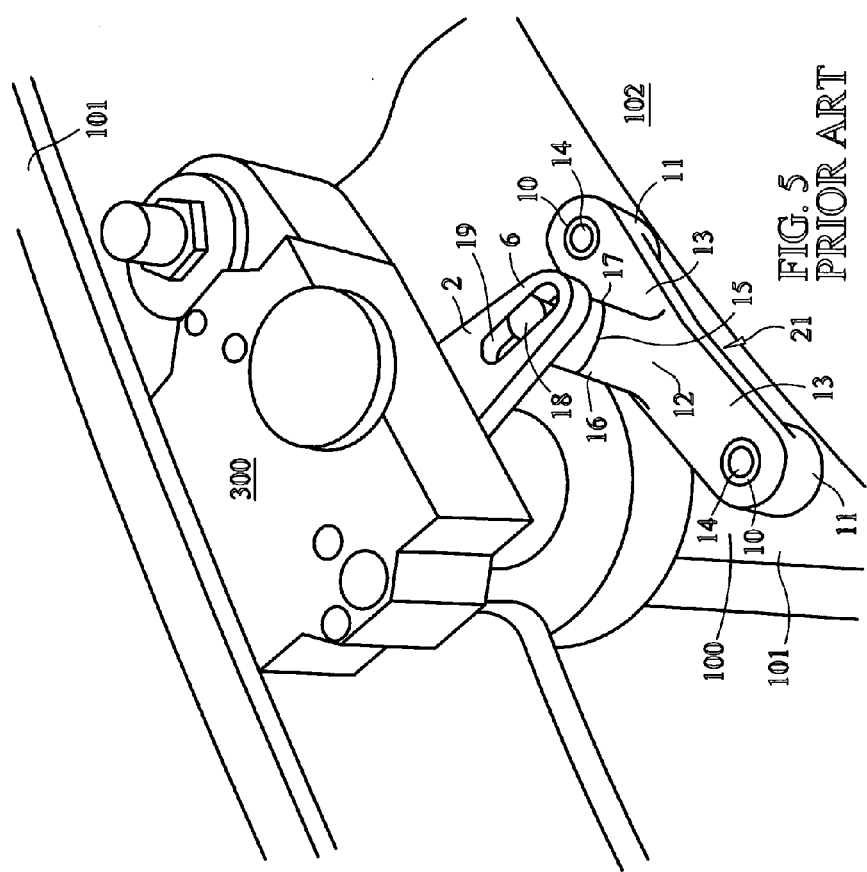
FIG. 5 is a perspective view from above a prior-art pin mount for a stabilizer arm installed on a motorcycle.
Figure 6:
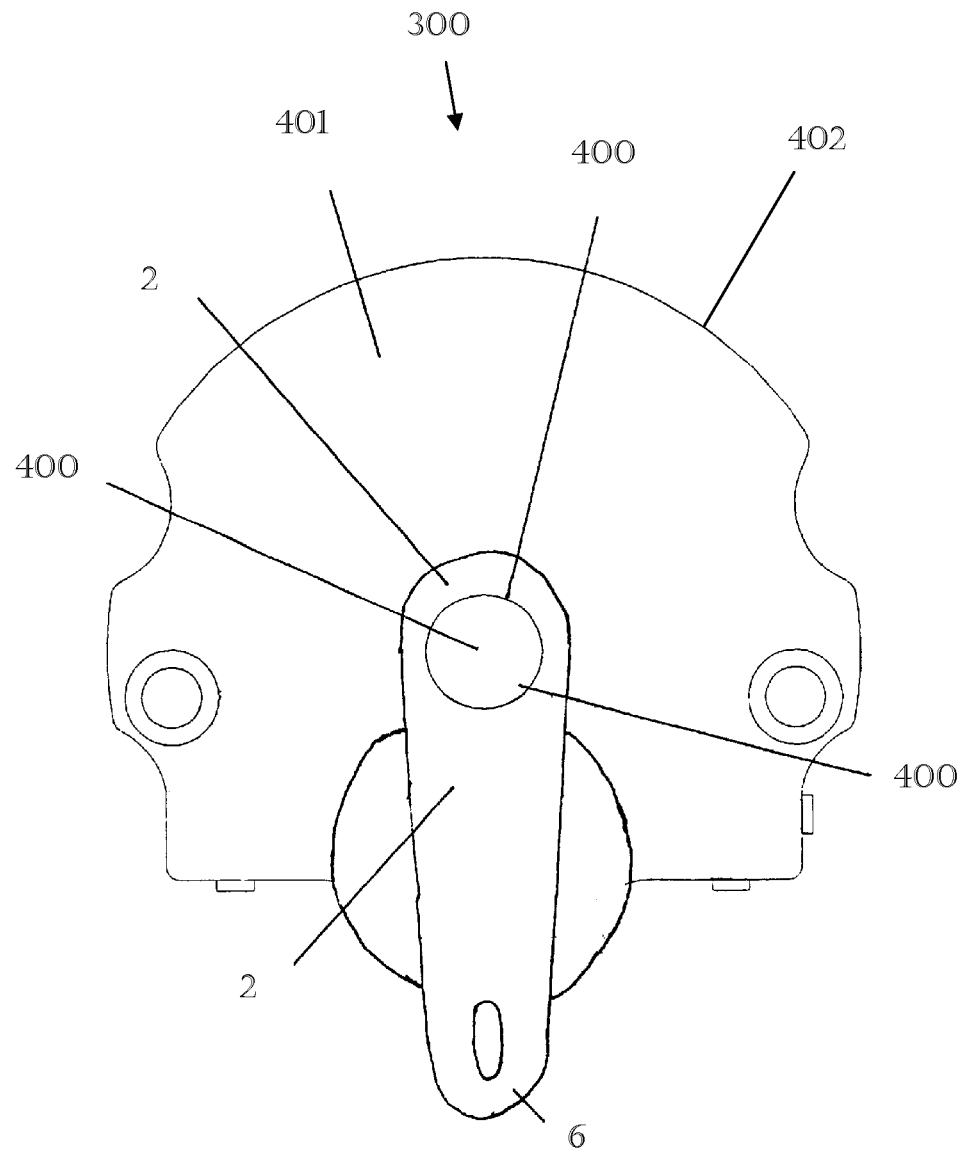
FIG. 6 is a plan view showing the bottom of a stabilizer, including an arm attached to a shaft.
Figure 7:
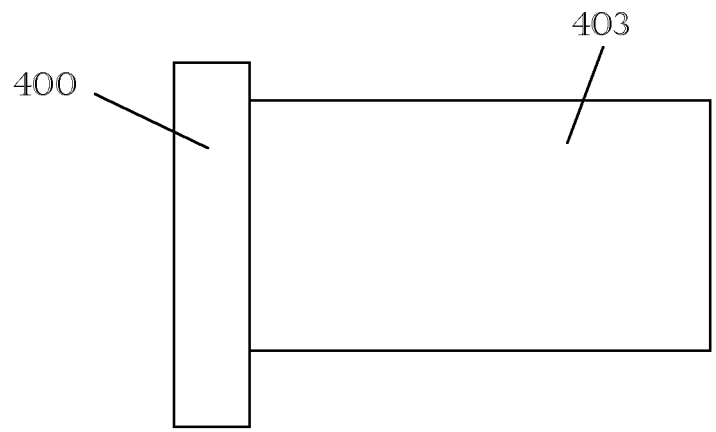
FIG. 7 is an elevational view of a wiper attached to the shaft of a stabilizer.
Figure 8:
FIG. 8 is a plan view of a wiper attached to the shaft of a stabilizer.
Figure 9:
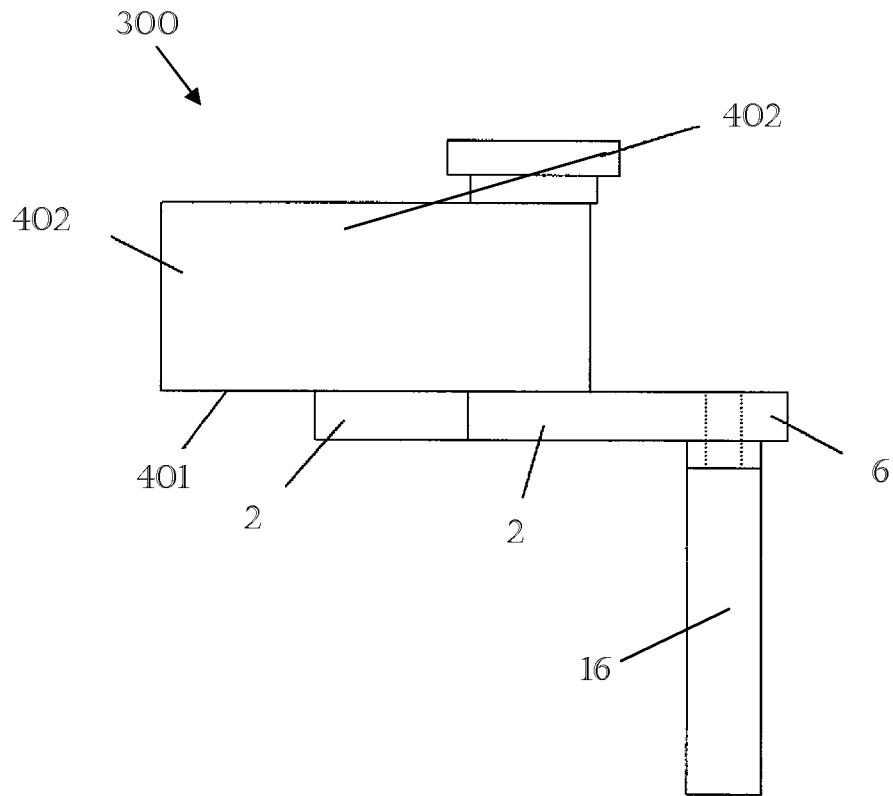
FIG. 9 is an elevational view of a stabilizer, including an arm extending from below the bottom of the housing for the stabilizer and connected to a traditional pin near the second end of the arm.
Figure 10:
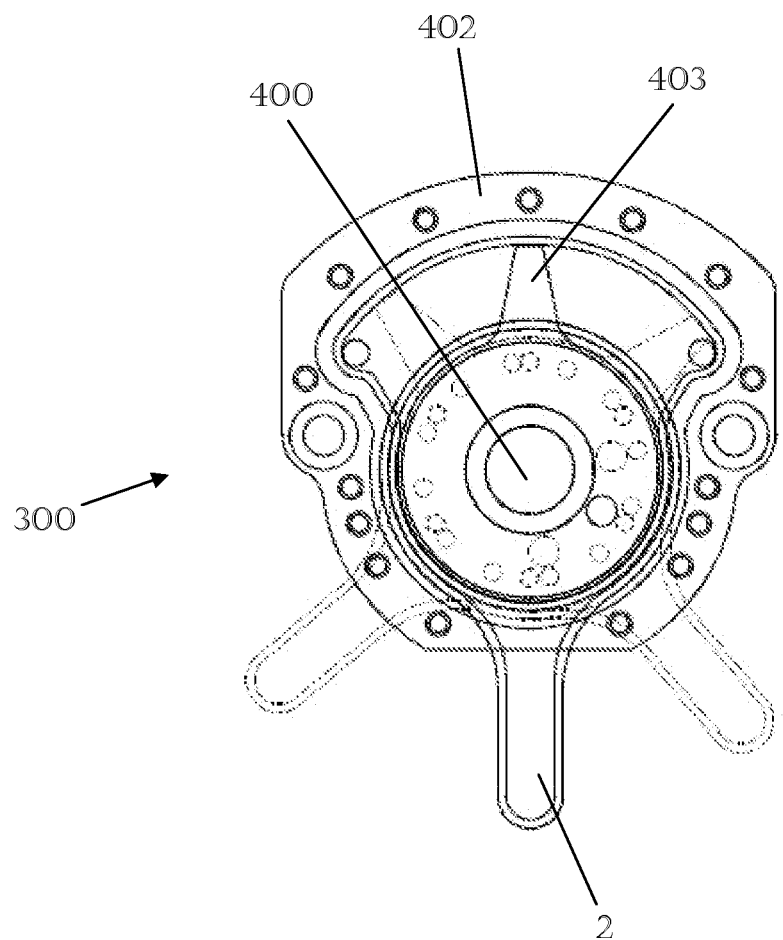
FIG. 10 is a plan view of the interior of a stabilizer, including a wiper attached to a shaft.

Both the yoke 1 of the preferred embodiment and the yoke 21 of the prior art are preferably attached in front of and near the fuel tank 102 for the motorcycle 101 and behind the handlebar 103 of the motorcycle 101, as illustrated in FIG. 3 and FIG. 5, respectively.

Although a preferred embodiment has been described above, the present invention merely requires (1) a mount 404, which comprises a platform 1 and projections 8 extending from the platform 1 so as to create a channel 7 between such projections 8, such platform 1 being adapted for stable attachment to a motorcycle; (2) an arm 2 with a first end 4 adapted for attachment to a shaft 400 from a wiper 403 of a motorcycle stabilizer 300 and with a second end 6 of such dimensions that such arm 2 can fit in the channel 7 between the projections 8; and (3) a means for releasably and securely fastening the second end 6 of such arm 2 between those projections 8.

I claim:

1. A pinless device for orienting a motorcycle stabilizer wiper, which comprises:
    a mount, which comprises:
        a platform, said platform being adapted for stable attachment to a motorcycle; and
        projections extending from the platform so as to create a channel between the projections;
    an arm having a first end adapted for attachment to a shaft from a wiper of a motorcycle stabilizer and also having a second end of such dimensions that the second end can fit in the channel between the projections; and
    a means for releasably and securely fastening the second end of said arm between the projections.

2. The pinless device for orienting a motorcycle stabilizer wiper as recited in claim 1, wherein:
    said platform is a y-shaped yoke, which comprises:
        a body from which said projections extend;
        a first base, the first base having an aperture;
        a second base, the second base having an aperture;
        a first lateral segment proceeding downward and outward from the body to connect the body to the first base; and
        a second lateral segment proceeding downward and outward from the body to connect the body to the second base; and
        the projections extend upward from the body.

3. The pinless device for orienting a motorcycle stabilizer wiper as recited in claim 2, wherein:
    the adaptation of the first end of said arm for attachment of the first end of said arm to said shaft from said wiper of said motorcycle stabilizer comprises:
        a channel in the first end of said arm having dimensions permitting the insertion of said shaft from said wiper of said motorcycle stabilizer in the first end of said arm and a set screw threadedly placed in the first end of said arm so that the set screw can be screwed into the channel in the first end of said arm while also being partially retained in the first end of said arm.

4. The pinless device for orienting a motorcycle stabilizer wiper as recited in claim 3, wherein:
    the means for releasably and securely fastening the second end of said arm between the projections comprises:
        a second set screw threadedly placed in one of the projections so that said second set screw can be screwed into the channel between the projections while also being partially retained in the one of the projections.

5. The pinless device for orienting a motorcycle stabilizer wiper as recited in claim 2, wherein:
    the means for releasably and securely fastening the second end of said arm between the projections comprises:
        a set screw threadedly placed in one of the projections so that the set screw can be screwed into the channel between the projections while also being partially retained in the one of the projections.

6. The pinless device for orienting a motorcycle stabilizer wiper as recited in claim 1, wherein:
    the adaptation of the first end of said arm for attachment of the first end of said arm to said shaft from said wiper of said motorcycle stabilizer comprises:
        a channel in the first end of said arm having dimensions permitting the insertion of said shaft from said wiper of said motorcycle stabilizer in the first end of said arm and a set screw threadedly placed in the first end of said arm so that the set screw can be screwed into the channel in the first end of said arm while also being partially retained in the first end of said arm.

7. The pinless device for orienting a motorcycle stabilizer wiper as recited in claim 6, wherein:
    the means for releasably and securely fastening the second end of said arm between the projections comprises:
        a second set screw threadedly placed in one of the projections so that said second set screw can be screwed into the channel between the projections while also being partially retained in the one of the projections.

8. The pinless device for orienting a motorcycle stabilizer wiper as recited in claim 1, wherein:
    the means for releasably and securely fastening the second end of said arm between the projections comprises:
        a set screw threadedly placed in one of the projections so that the set screw can be screwed into the channel between the projections while also being partially retained in the one of the projections.

9. A pinless device for orienting a motorcycle stabilizer wiper, which comprises:
- a mount comprising a y-shaped yoke, which y-shaped yoke comprises:
  - a body;
  - a first base, the first base having an aperture;
  - a second base, the second base having an aperture;
  - a first lateral segment proceeding downward and outward from the body to connect the body to the first base;
  - a second lateral segment proceeding downward and outward from the body to connect the body to the second base; and
  - projections extending upward from the body so as to create a channel between the projections;
- an arm having a first end containing a channel with dimensions permitting the insertion of a shaft from a wiper of a motorcycle stabilizer, having a set screw threadedly placed in the first end of said arm so that the set screw can be screwed into the channel in the first end of said arm while also being partially retained in the first end of said arm, and having a second end of such dimensions that the second end can fit in the channel between the projections; and
- a second set screw threadedly placed in one of the projections so that said second set screw can be screwed into the channel between the projections while also being partially retained in the one of the projections.

\* \* \* \* \*